July 10, 1951          G. L. BAHRE          2,559,698
STEREOSCOPIC MAGNIFIER
Filed Oct. 6, 1949
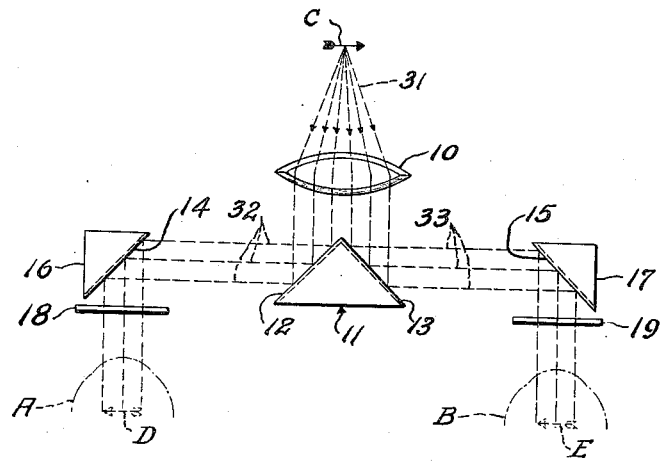
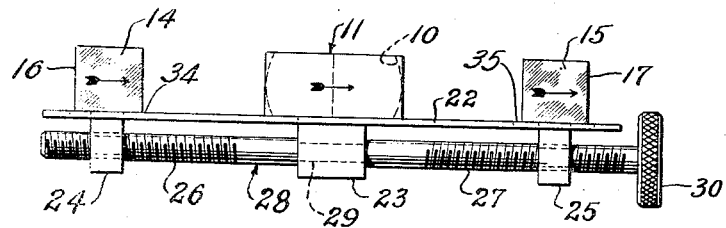
INVENTOR.
GEORGE L. BAHRE
BY
ATTORNEY Patented July 10, 1951

2,559,698

UNITED STATES PATENT OFFICE 2,559,698

STEREOSCOPIC MAGNIFIER

George L. Bahre, Meriden, Conn.

Application October 6, 1949, Serial No. 119,854

2 Claims. (Cl. 88—39)

This invention relates to magnifiers for the visual observation of small objects, such as watch movements, and more particularly to a stereoscopic magnifier providing binocular lines of sight which will enable the user to clearly perceive the contour or configuration of an object, thus facilitating examination of and work upon the object.

One object of this invention is to provide a device of the above nature which employs a single objective or magnifier lens for both of the binocular lines of sight.

Another object is to provide a device of the above nature in which the binocular lines of sight are readily adjustable to provide different interpupillary distances without otherwise affecting the operation of the instrument.

A further object is to provide a device of the above nature which will be simple in construction, inexpensive to manufacture, easy to use and manipulate, compact, and very efficient and durable in use.

With these and other objects in view, there has been illustrated on the accompanying drawing one form in which the invention may conveniently be embodied in practice.

In the drawing:

Fig. 1 is a diagrammatic plan view of the improved stereoscopic magnifier.

Fig. 2 is an elevation of the same, showing the mechanism for adjusting the interpupillary distance of the lines of sight.

Referring now to the drawing in which like reference numerals denote corresponding parts throughout the several views, the numeral 10 indicates a single objective lens or magnifier which has surfaces of spherical curvature and a short focal length, this preferably being from 1″ to 6″. Directly back of the objective lens 10, provision is made of a prism or block 11 which is mounted in alignment with the axis of the lens 10, and is provided with flat reflecting surfaces 12, 13 which are disposed at 90 degrees to each other, and which are located behind respective lateral halves of said lens at angles of 45 degrees to the axis thereof.

At equidistantly spaced positions laterally of the prism 11, provision is made of a pair of reflecting surfaces 14, 15, which may conveniently be formed by the surfaces of respective side prisms 16, 17. The reflecting surfaces 14, 15 are so arranged as to be disposed parallel to the reflecting surfaces 12, 13, respectively, so that light rays may be directed rearwardly therefrom toward the user's eyes A and B, in directions which are parallel to the rays directed rearwardly from the lens 10.

The improved magnifier will also preferably include a pair of correction lenses 18, 19 of any suitable characteristics necessary to accommodate the instrument to the user's eyes.

In practice, provision is made of a flat, laterally extending base 22 (Fig. 2) upon which the prism 11 is mounted in a central fixed position, and which is provided with a laterally apertured, depending lug 23 directly below said prism.

The side prisms 16, 17 are provided with depending lugs 24, 25, slidably mounted in the laterally extending openings 34, 35, respectively, in the end portions of the base 22. The depending lugs 24, 25 have tapped lateral apertures engaged with right hand and left hand screw threads 26, 27 upon opposite end portions of a horizontal screw 28.

The screw 28 is rotatably held against longitudinal movement by means of a central reduced section 29 engaged in the fixed lug 23, and also has a knurled end knob 30 to facilitate manual operation thereof. Thus, it will be seen that the knob 30 may be turned so as to adjust the side prisms 16, 17 to and from the fixed central prism 11 and thus accommodate the interpupillary distances of different users, said side prisms 16, 17 always being maintained at equal distances from the axis of the objective lens 10, and also being maintained always at the same angle with reference to the central prism 11.

Operation

In operation, the object to be observed, as indicated diagrammatically by the arrow C, will be placed at a suitable distance in front of the objective lens 10, and the knob 30 will be manipulated so as to set the prisms 16, 17 at a distance apart which is equal to the interpupillary distance of the user.

The rays of light from the object C, as indicated by the broken lines 31, will then pass through the lens 10 and will be split into oppositely extending rays 32, 33 by the reflecting surfaces 12, 13, these rays then being reflected rearwardly by the reflecting surfaces 14, 15, and resulting in images D and E within the eyes A and B of the user.

It will be noted that the rays of light passing through the respective lateral halves of the objective lens 10 will result in sufficient parallax to produce a difference in the images D and E which will be suitable to produce stereoscopic vision in the user's eyes A and B.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a stereoscopic magnifier, a base, a magnifying objective lens of short focal length fixed with respect to said base, a pair of vertical reflecting surfaces mounted on one side of said base and disposed directly behind the respective lateral halves of said lens for reflecting rays from said lens laterally in aligned opposite directions, a pair of laterally adjustable reflecting surfaces slidably mounted on the same side of said base and laterally spaced from said first pair of reflecting surfaces for reflecting said rays rearwardly in parallel directions, and mechanism for maintaining said adjustable reflecting surfaces equidistant from said first reflecting surfaces in all stages of adjustment thereof, said mechanism comprising a pair of aligned laterally extending openings in said base, a laterally extending screw on the other side of said base having right hand and left hand threaded portions cooperatively engaged respectively in apertured lugs connected to the adjustable reflecting surfaces and extending through said openings in said base, said screw being provided with means rotatably holding it against longitudinal movement, whereby the interpupillary distance of the magnifier may be adjusted by turning said screw.

2. The invention as defined in claim 1 wherein said screw holding means comprises an apertured lug fixed to said other side of said base in alignment with and centrally disposed with respect to said apertured lugs, and a reduced section in said screw engaged in said fixed lug.

GEORGE L. BAHRE.

REFERENCES CITED

The following references are of record in the file of this patent:

UNITED STATES PATENTS

| Number | Name | Date |
|---|---|---|
| 230,320 | Molera et al. | July 20, 1880 |
| 2,149,601 | Guldbrandsen | Mar. 7, 1939 |

FOREIGN PATENTS

| Number | Country | Date |
|---|---|---|
| 471,602 | France | July 16, 1914 |
| 291,193 | Germany | July 6, 1916 |
| 149,636 | Great Britain | Dec. 23, 1920 |
| 431,083 | Germany | July 3, 1926 |
| 628,875 | France | July 11, 1927 |
| 701,940 | France | Jan. 13, 1931 |